Figure 1:
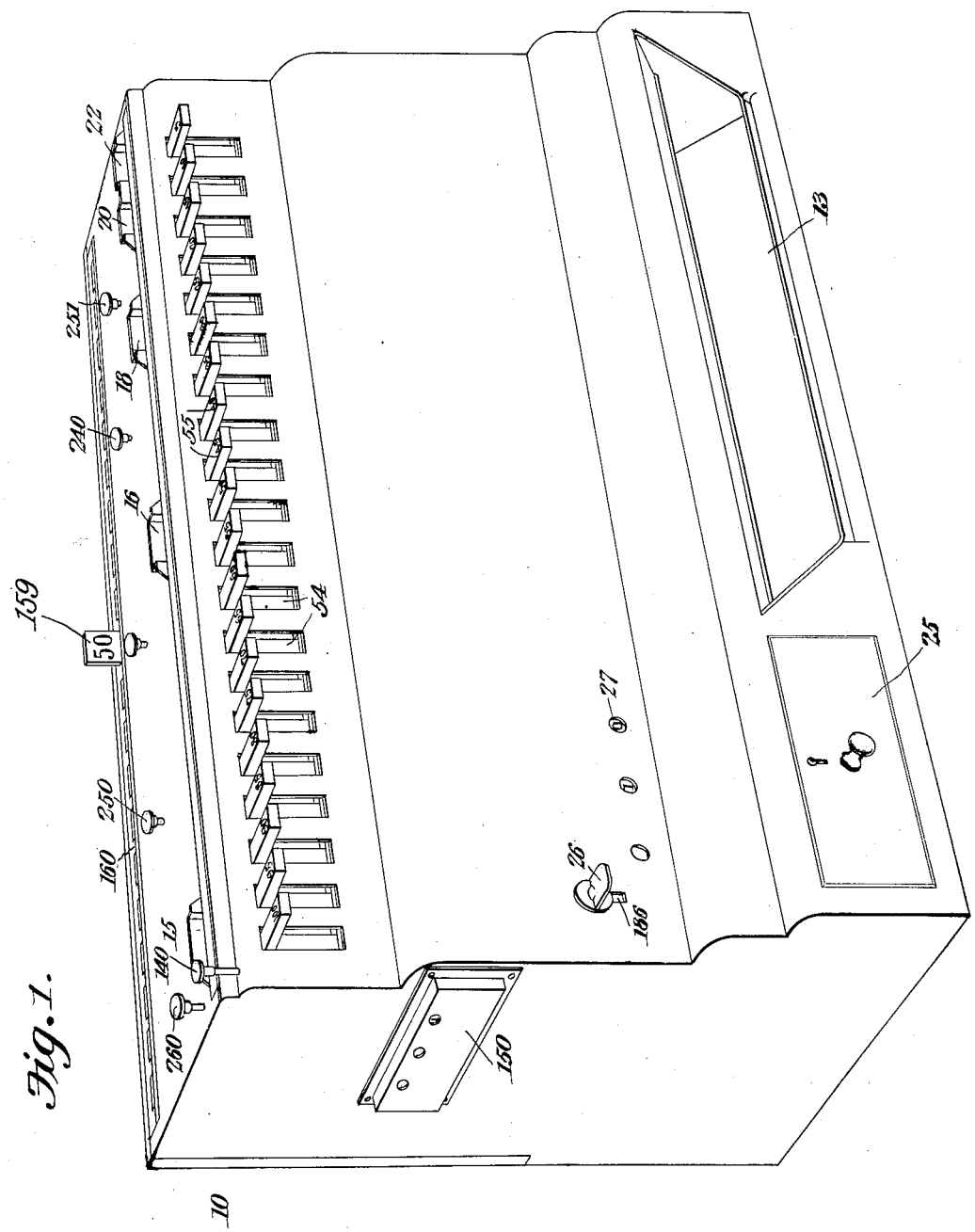

No. 861,316. PATENTED JULY 30, 1907.
A. PETERSON.
CHANGE MAKING MACHINE AND CASH REGISTER.
APPLICATION FILED FEB. 19, 1906.
10 SHEETS—SHEET 1.

WITNESSES:

Andrew Peterson INVENTOR

By

ATTORNEYS

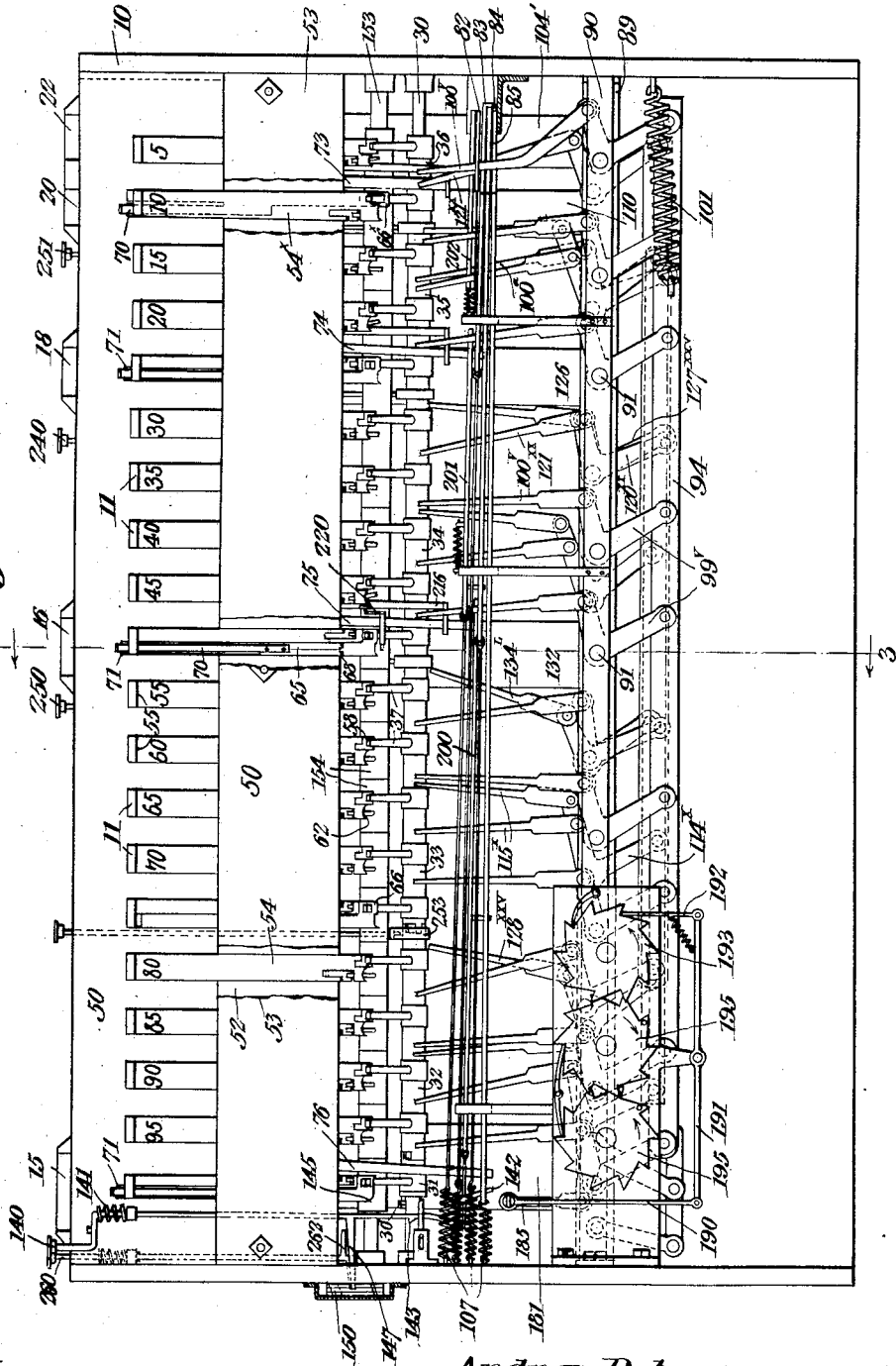

No. 861,316. PATENTED JULY 30, 1907.
A. PETERSON.
CHANGE MAKING MACHINE AND CASH REGISTER.
APPLICATION FILED FEB. 19, 1906.
10 SHEETS—SHEET 3.

WITNESSES:  Andrew Peterson  INVENTOR
By  CA Snow & Co
ATTORNEYS

No. 861,316. PATENTED JULY 30, 1907.
A. PETERSON.
CHANGE MAKING MACHINE AND CASH REGISTER.
APPLICATION FILED FEB. 19, 1906.
10 SHEETS—SHEET 4.
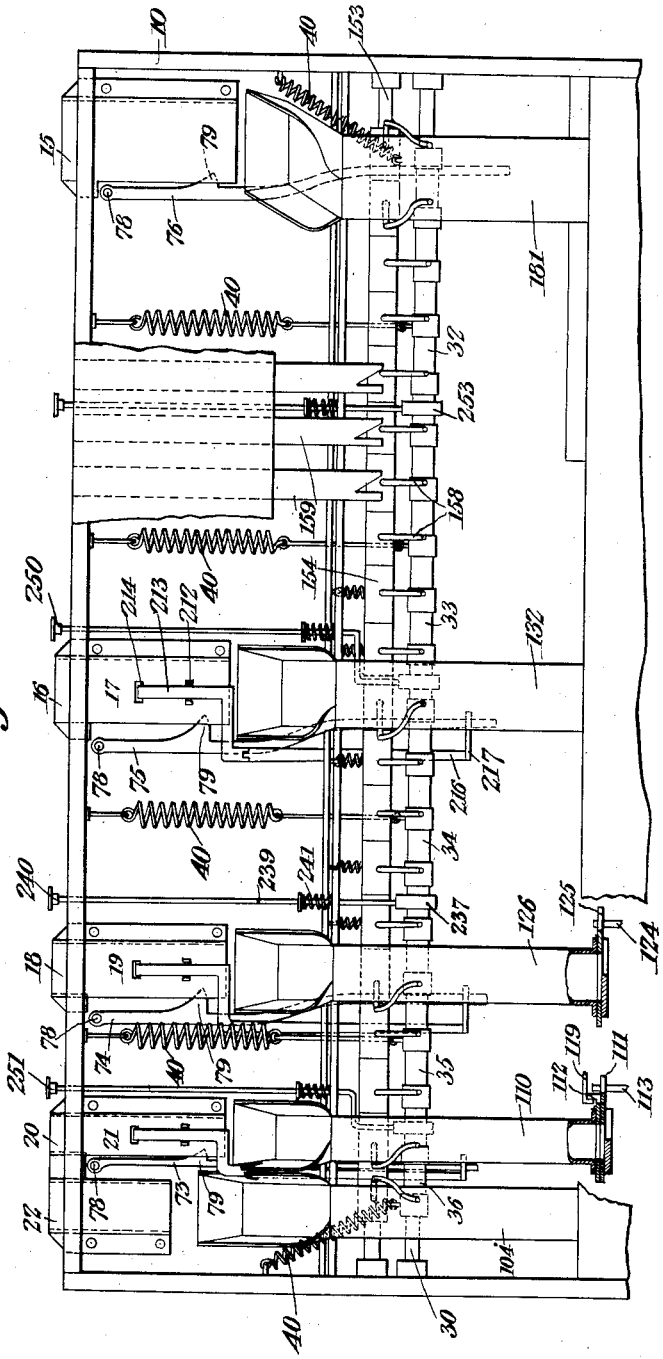
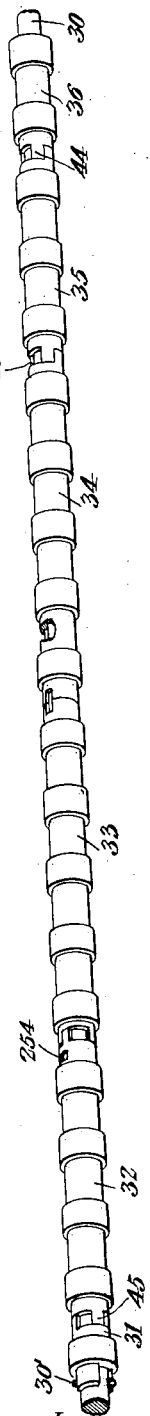
WITNESSES: Andrew Peterson INVENTOR
By C. A. Snow & Co.
ATTORNEYS No. 861,316. PATENTED JULY 30, 1907.
A. PETERSON.
CHANGE MAKING MACHINE AND CASH REGISTER.
APPLICATION FILED FEB. 19, 1906.
10 SHEETS—SHEET 5.
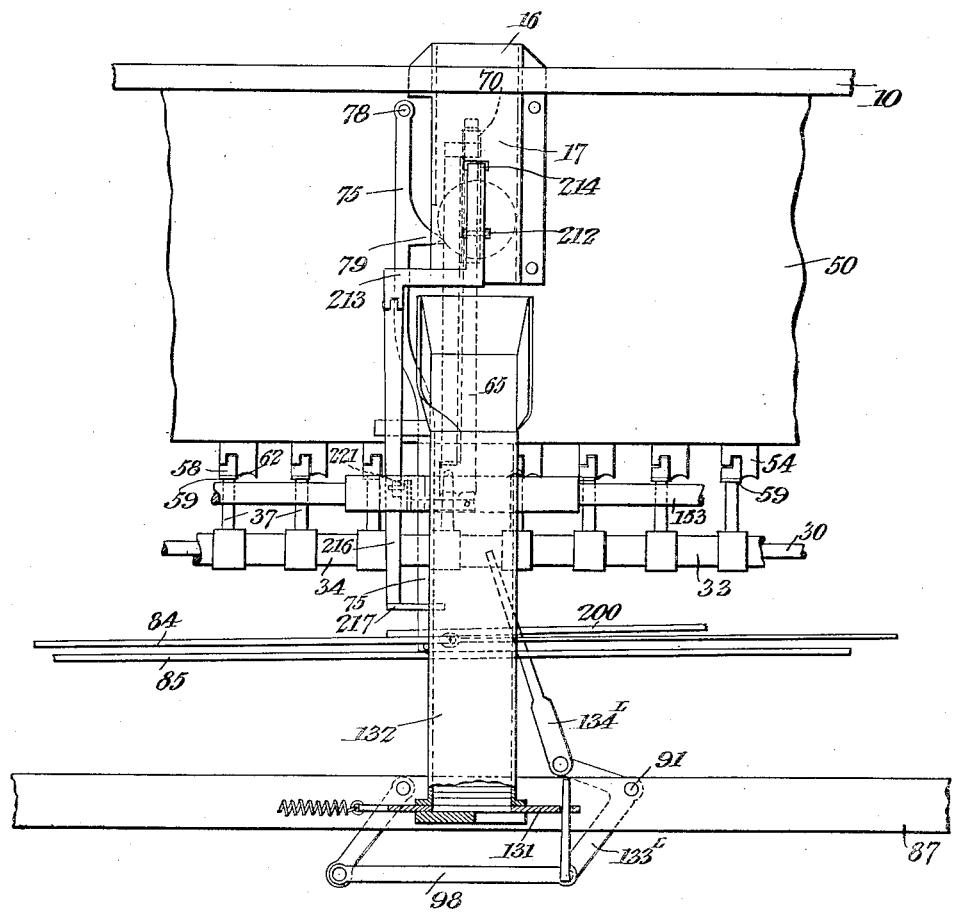
Fig. 5.
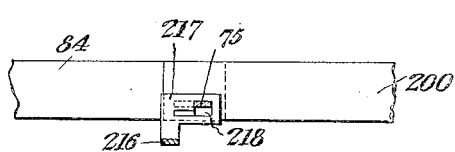
Fig. 6.
Fig. 9.
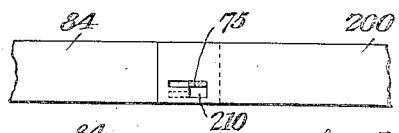
Fig. 7.
Fig. 8.
WITNESSES:
Andrew Peterson
INVENTOR
By
ATTORNEYS

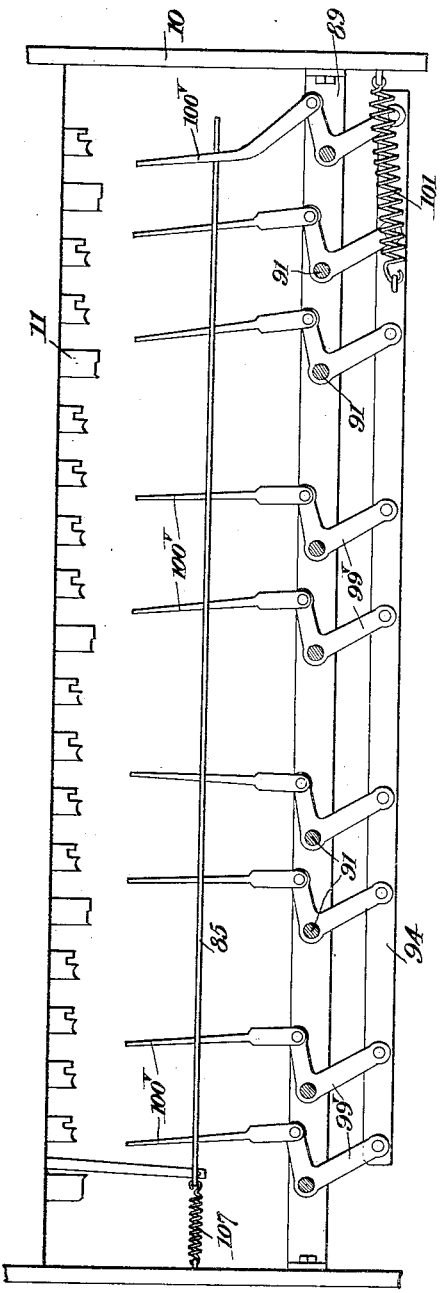
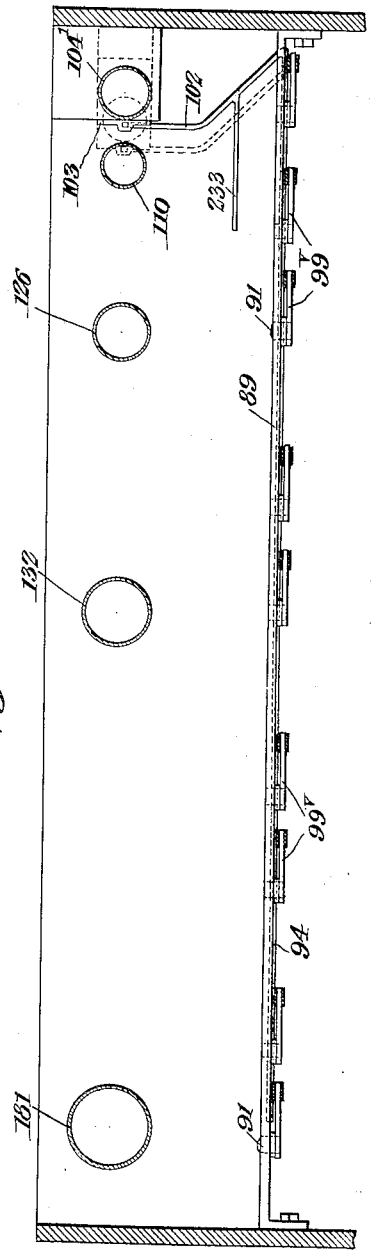

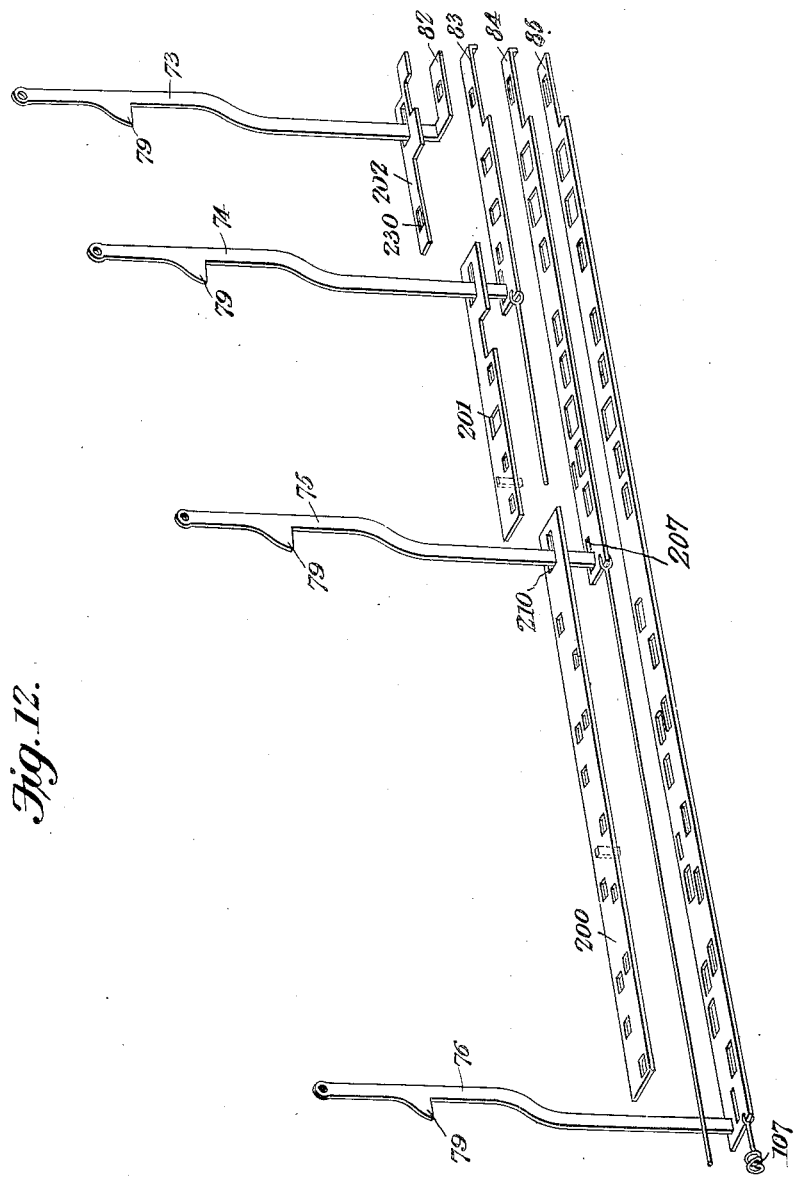

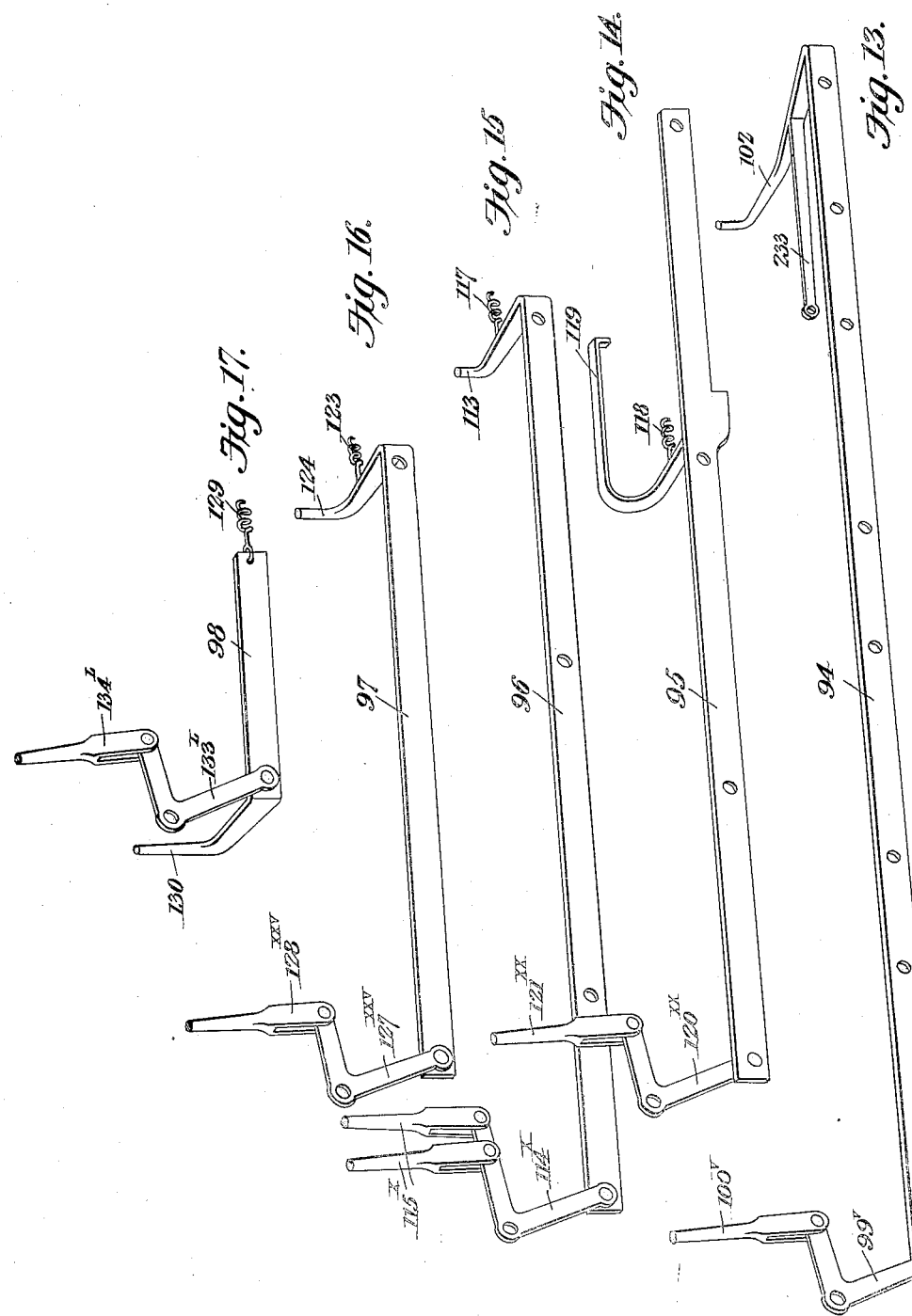

No. 861,316. PATENTED JULY 30, 1907.
A. PETERSON.
CHANGE MAKING MACHINE AND CASH REGISTER.
APPLICATION FILED FEB. 19, 1906.

10 SHEETS—SHEET 9.

WITNESSES:

*Andrew Peterson* INVENTOR

By *C. A. Snow & Co*
ATTORNEYS

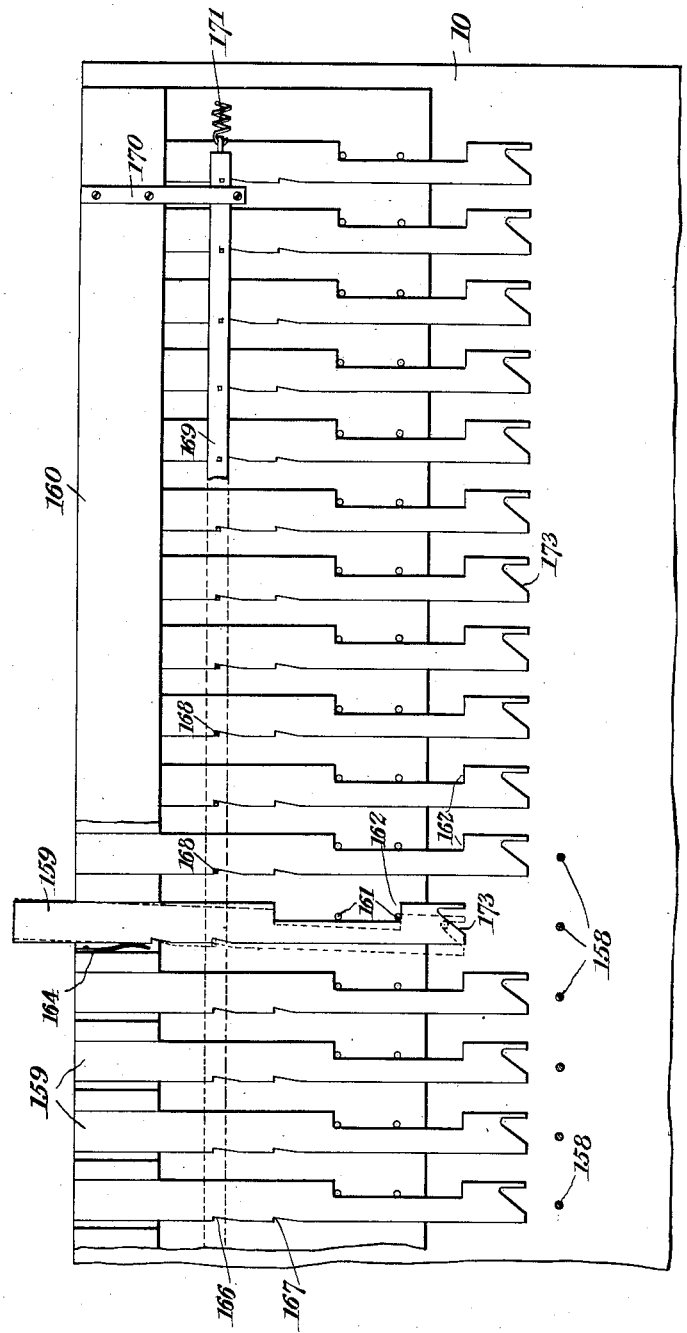

UNITED STATES PATENT OFFICE.

ANDREW PETERSON, OF LAMONT, OKLAHOMA TERRITORY.

CHANGE-MAKING MACHINE AND CASH-REGISTER.

No. 861,316.  Specification of Letters Patent.  Patented July 30, 1907.

Application filed February 19, 1906. Serial No. 301,863.

*To all whom it may concern:*

Be it known that I, ANDREW PETERSON, a citizen of the United States, residing at Lamont, in the county of Grant and Oklahoma Territory, have invented a new and useful Change-Making Machine and Cash-Register, of which the following is a specification.

This invention relates to change making machines, and has for its principal object to provide a machine of very simple construction, in which no mental calculation is necessary to secure the delivery of the correct amount of change.

A further object of the invention is to construct a machine in which the work of the operator is merely that necessary to the operation of an ordinary cash register; that is to say, the striking of a key to register or indicate the amount of purchase.

A still further object of the invention is to construct a change making machine in which the depression of a single key controls the delivery of the correct amount of change without regard to the value of the coin or coins tendered for the purchase, and generally known in this art as the amount of deposit.

A still further object of the invention is to provide a machine in which the coins deposited pass to the reservoirs or magazines from which they may be subsequently drawn in making change.

A still further object of the invention is to provide a machine in which provision is made for the collection of surplus coins after any one magazine has been filled.
A still further object of the invention is to construct a machine in which the change delivery mechanism is controlled by deposited coins, and further to so arrange and construct the mechanism that each coin can act only on delivery mechanisms of a smaller value than the amount deposited.

A still further object of the invention is to provide for the grouping of the keys with respect to the mechanisms under the control of deposited coins, so that it will be impossible to effect the delivery of change of an amount greater than the value of the deposited coins.

A still further object of the invention is to provide in a machine of this class for the changing of coins or paper money of a value higher than that controlled by the machine, and to provide for the registration of all change so delivered.

A still further object of the invention is to provide a change making machine with a registering mechanism that will indicate the amount of purchase, the amount of each purchase remaining displayed until another purchase is registered.

A still further object of the invention is to provide for the deposit of more than one coin of the same diameter tendered at the same time; for instance, the tender of two half dollars in payment of a sixty cent purchase, or the tender of two quarter dollars in payment of a thirty cent purchase.

With these and other objects in view, as will more fully hereinafter appear, the invention consists in certain novel features of construction and arrangement of parts, hereinafter fully described, illustrated in the accompanying drawings, and particularly pointed out in the appended claims, it being understood that various changes in the form, proportions, size and minor details of the structure may be made without departing from the spirit or sacrificing any of the advantages of the invention.

Figures 3, 18:
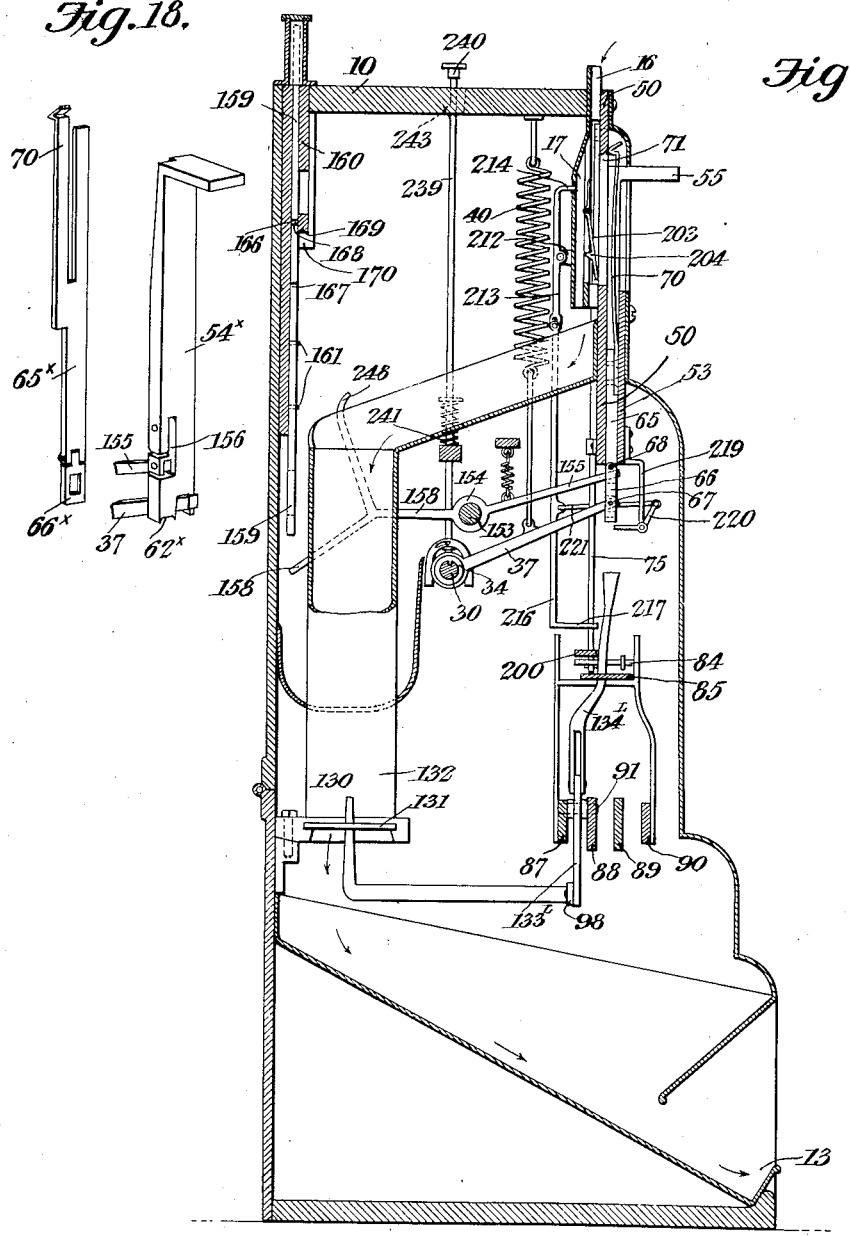
Figure 21:
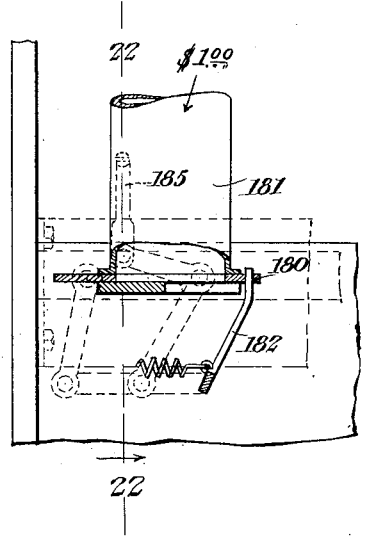
Figure 22:
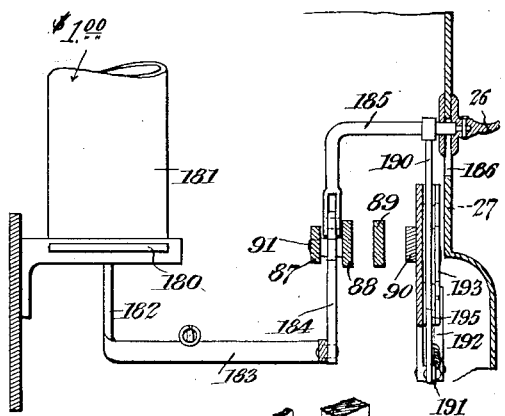
Figure 28:
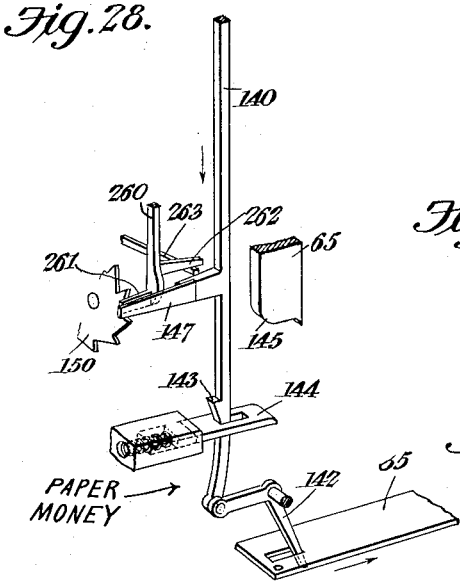
Figure 20:
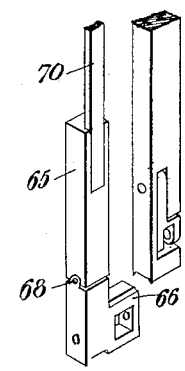
Figure 19:
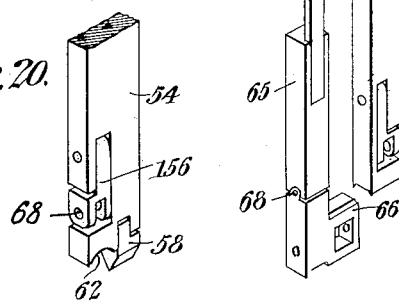
Figure 24:
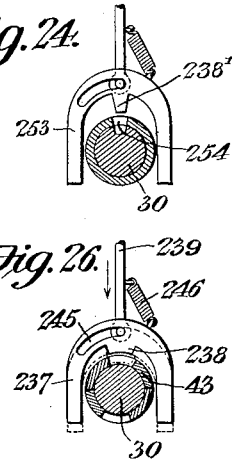
Figure 25:
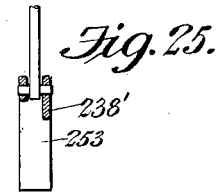
Figure 26:
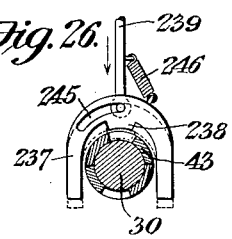
Figure 27:
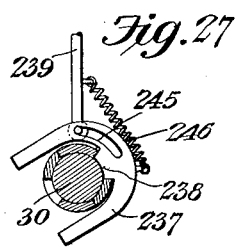

In the accompanying drawings:—Figure 1 is a perspective view of a change making and registering machine constructed in accordance with the invention. Fig. 2 is a front elevation of the machine with the front casing removed. Fig. 3 is a transverse sectional view of the machine on the line 3—3 of Fig. 2, the view being on an enlarged scale Fig. 4 is a rear elevation of the machine, parts being broken away and the back of the casing removed in order to more clearly illustrate the construction. Fig. 5 is a detail view of a portion of the machine looking from the rear and illustrating on an enlarged scale the half dollar deposit chute and reservoir, together with the mechanism associated therewith. Figs. 6, 7 and 8 are plan views, partly in section, illustrating the arrangement and construction of the slides which are brought into play where two half dollars are deposited at the same time. Fig. 9 is a detail perspective view of the arm which controls the movement of one or other of the slides. Fig. 10 is a detail view of the lower portion of the front of the machine, illustrating principally the nickel delivery bar and its connections. Fig. 11 is a plan view of the same. Fig. 12 is a detail perspective view of the principal coin actuated slides which control the positions of the change delivery fingers. Fig. 13 is a detail perspective view of the five cents delivery bar, detached. Figs. 14, 15, 16 and 17 are similar views illustrating, respectively, the twenty cents, ten cents, twenty-five cents and fifty cents delivery bars. Fig. 18 is a detail perspective view of the ten cents purchase key, detached. Fig. 19 is a detail perspective view of the lower portion of the twenty-five, fifty cents or dollar key. Fig. 20 is a similar view of one of the other purchase keys. Fig. 21 is an elevation, partly in section, of the lower portion of the dollar magazine and its delivery slide. Fig. 22 is a side view of the same, partly in section on the line 22—22 of Fig. 21. Fig. 23 is a detail perspective view of the main rock shaft and rocking sleeves, detached. Fig. 24 is a transverse sectional view through a portion of the rock shaft, showing one of the clutches in elevation. Fig. 25 is a vertical sectional view of the clutch. Fig. 26 is a view similar to Fig. 24, showing another clutch employed for connecting adjacent rocker sleeves. Fig. 27 is a similar view showing the operation of the clutch. Fig. 28 is a detail perspective view of a portion of the mechanism employed in making change and registering when a paper dollar or a higher amount is tendered. Fig. 29 is a rear elevation of a portion of the registering or indicating mechanism, drawn to an enlarged scale, parts being broken away in order to more clearly illustrate the construction.

Similar numerals of reference are employed to indicate corresponding parts throughout the several figures of the drawings.

The machine forming the subject of the present invention is so constructed that should the clerk or salesman receive the amount of deposit, say a silver dollar, in payment for a purchase amounting to sixty-five cents, he places the dollar in a chute which leads to the dollar magazine. The dollar, however, is caught and held within the chute, and when the sixty-five cent key is depressed, it operates through certain mechanism to force the dollar down through the chute into the magazine, and as the dollar travels it operates a slide which moves a change discharging finger under the end of the sixty-five cent key, and as down pressure on the latter continues, the key bar engages this finger and operates to deliver a quarter dollar and a dime, being the proper change, and the operation being accomplished by the employment of a single key bar representing the amount of purchase. The work accomplished by the clerk or operator is similar to that involved in an ordinary cash register, and the machine not only serves to deliver the change, but, also, acts as a registering device, the depression on the sixty-five cent key resulting in the movement of the sixty-five cent purchase card to display position, and this card remaining in position until another purchase key is depressed.

The operation of the machine will be better understood if it is borne in mind that when a dollar is deposited it operates to adjust change delivery fingers under every one of the key bars of smaller denomination, and the depression of one of said key bars representing a purchase of less than one dollar will result in the delivery of the proper amount of change. In similar manner the deposit of a half dollar controls the adjustment of change delivery fingers under all of the key bars representing values of less than one half dollar, but not more, so that if on the deposit of a half dollar a purchase key of a higher value than a half dollar is depressed, no change will be delivered. In similar manner the quarter dollar will control the adjustment of change delivery fingers under key bars of a value less than that sum, while a dime will control the delivery of change less than a dime, and, if necessary, a nickel may be arranged to control the delivery of cents, and it is to be understood that while the machine forming the subject of the present invention is described as operated in connection with United States currency, it may be suitably modified for use in connection with the currency of any foreign nation.

The working parts of the machine are arranged within a suitable casing 10, at the upper front portion of which are the purchase keys, and at the rear of the top portion of the casing are slides or guides for the display cards 159 on which the amount of purchase is displayed. At the lower front portion of the casing is a trough 13 of convenient size and shape in which the change falls. The amounts deposited are inserted in suitable chutes that project above the upper front part of the case, there being one chute 15 for the insertion of silver dollars, two chutes, 16 and 17, for the insertion of half dollars, two chutes, 18 and 19, for the insertion of quarter dollars, and two chutes, 20 and 21, for the insertion of dimes, and a single chute, 22, for the insertion of nickels. The number of chutes may be increased both above and below the denominations named in order to increase the capacity of the machine, thus for instance, additional chutes may be employed for five, ten, and twenty dollar gold pieces, and a chute or chutes for cents.

At the lower left hand corner of the machine is a drawer 25 that extends under the magazine in which the silver dollars are deposited, and above this drawer is a discharge button or knob which may be operated for the purpose of withdrawing silver dollars from the magazine and allowing them to fall into the drawer, the number of times the knob is operated being indicated at 27. This latter mechanism, as will hereinafter appear, is intended to be used where a purchaser tenders paper money, or gold above the value of one dollar, which must be exchanged for silver to operate the machine. The machine is so constructed that it may be operated on the tender of a paper or gold dollar.

Extending transversely across the machine and supported in suitable bearings at the opposite ends thereof, is a shaft 30 (Figs. 2, 4 and 23) on which are arranged a number of sleeves 31, 32, 33, 34, 35 and 36 which are wholly or partly independent of each other, as will more fully hereinafter appear, and from these sleeves extend rocker arms 37 that are approximately spaced at equidistant intervals throughout the width of the machine. These rocker arms 37 are twenty in number, there being one rocker arm for each finger key, and the finger keys being made to represent all sums between five cents and one dollar in multiples of five. The rocker arms 37 of the five and ten cent keys are secured to the sleeve 36. The rocker arms of the fifteen, twenty and twenty-five cent keys are secured to the sleeve 35. The rocker arms of the 30, 35, 40, 45, 50 cent keys are secured to the sleeve 34. The rocker arms of the 55, 60, 65, 70 and 75 cent keys are secured to the sleeve 33. The rocker arms of the 80, 85, 90 and 95 cent keys are secured to the sleeve 32. The rocker arm of the dollar key is secured to the sleeve 31. The rocker arms are all held in the normal elevated positions by means of helical tension springs 40 (Figs. 3 and 4) that extend between the top of the casing and one arm of each group, there being six springs to correspond to the six different groups of arms. The sleeves are divided into groups that are partly independent of each other, the division line being between the 50 and 55 cent arm, (Fig. 23) while the sleeves of each group are more or less independent.

Between the sleeves 34 and 35 are clutch teeth 43, so arranged that the sleeve 34 may be turned when any one of its rocker arms is depressed, without turning either the sleeve 35 or the sleeve 36, but when sleeve 35 is turned by the depression of one of its rocker arms, the sleeve 34 and all of its rocker arms will be moved. Between the sleeves 35 and 36 are clutch teeth 44, so arranged that sleeve 35 may be turned without revolving the sleeve 36, but if sleeve 36 is turned, it will revolve both the sleeves 34 and 35, so that all of the rocker arms from the five to the fifty cent key will be depressed.

The dollar sleeve 31 may be turned independently of the sleeves 32 and 33, but between sleeves 31 and 32 are clutch teeth 45, so arranged that if the sleeve 32 is turned, the sleeve 31 will, also, be turned, and while sleeve 32 may be turned independently of the sleeve 33, clutch members are so arranged that if sleeve 33 is turned, both sleeves 31 and 32 will, also, be turned, and all of the rocker arms belonging to keys of value from 55 cents to one dollar will be depressed. The sleeve 34 is fixed to the shaft 30 and said shaft carries a pin 30' which engages and turns the dollar sleeve 31, the latter being operated each time any of the other sleeves is moved. Provision is, also, made, as will hereinafter appear, for further clutching certain of the sleeves when it is desired to permit the operation of the machine by the insertion of two coins of the same value at the same time, as, for instance, two half dollars, two quarter dollars, or two dimes, in which case it becomes necessary to temporarily lock the sleeves in order that movement of one group of rocker arms may be transmitted to another group of rocker arms and insure the delivery of the proper amount of change.

At the upper front portion of the machine is a plate 50 (Figs. 2 and 3) that extends completely across from end to end of the machine, and is provided with a plurality of spacer or guide blocks 52 on its front face, and to these spacer and guide blocks is secured an outer plate or strip 53, and the whole forming a series of vertical guide-ways for the reception of vertically movable key bars 54 that are bent outward at their upper ends, forming finger key members 55 on which are numerals representing the values controlled by the keys, that is to say, values from five cents to one dollar in multiples of five. These key bars rest on the rocker arms 37 and are normally held in elevated position by the springs 40.

The key bars differ somewhat in construction, but all of the bars, with the exception of the ten cent, twenty-five cent, fifty cent, seventy-five cent and one dollar keys are precisely alike, and are provided at their lower ends with small pivoted blocks 58 (Fig. 20) formed of hardened metal and provided with knife edges which enter small grooves or notches 59 formed in the rocker arms 37, so that the key bars may move in fixed vertical lines, while the rocker arms travel in arcuate paths, and the knife edge blocks, being pivoted, will yield to compensate for the arcuate movement of said arms without unduly increasing the friction. Each of the knife edge blocks occupies approximately one-half of the width of the lower portion of the key bar, and the opposite half of the lower end of each bar is provided with a recess 62 that is designed to engage with coin discharging fingers as will hereinafter appear.

The 25 cent, 50 cent and one dollar key bars are narrower than the remainder, being approximately one half their width, and in the guiding space of each of these key bars there is, also, arranged a vertically movable bar 65 (Fig. 19), at the lower end of which is, a laterally extended lug 66 that projects under the lower end of the narrow key bar, and the upper surface of the lug is preferably ribbed, while the lower end of the key bar is grooved to form a connection which will permit transmission of movement from the key bar to the lug without danger of displacement. The lower surface of the lug is recessed for the reception of the upper end or ends of change delivery fingers. The lugs 66 are provided with openings for the passage of the rocker arms 37 to which they transmit motion, and a pin 67 (Fig. 3) extending through both the lug and the rocker arm forms a pivotal connection, so that positive movement from these members of the machine may be insured. In order to avoid friction between the slide bar and its guide, said bar is preferably formed in two sections united by a pivot pin 68 (Fig. 20) in order to compensate for the arcuate path of movement of the arm 37.

Projecting from the upper end of each bar 65 is a spring coin engaging finger 70 that extends through a slot 71 formed in the plate 50 (Fig. 3) at a point in alinement with the coin chute, and said finger has an inclined upper end which rides against the beveled upper end of the slot, so that said finger is normally held out of the chute to permit the free passage of a coin, and after the coin is in position and the finger bar which operates the slide bar 65 is depressed, said spring finger will enter the chute and will engage with the upper edge of the coin, and as the finger bar and the bar 65 are moved down, the coin will be, also, forced down positively, and during this movement will adjust the change delivery fingers in position below the several key bars.

The construction of the key bar of the 75 cent denomination is similar to that just described, with the exception that the coin engaging finger 70 is dispensed with, there being no coin chute to the rear of the 75 cent key bar.

The construction of the ten cent key bar differs materially from the construction of the 25 cent and 50 cent key bars. In these latter key bars the rocker arms 37 are so arranged that they will impart positive downward movement to the bars 65 for the purpose of effecting the delivery of change, and at the same time pull down the entered coin by the coin engaging spring 70. Owing to the peculiar arrangement of the change delivery mechanism, as will hereinafter appear, such a movement of the 10 cent key bar would result at times in the delivery of excess change, and to overcome this difficulty, the key bar is made in the manner shown in Fig. 18.

The key bar 54$^x$ is arranged to descend and engage with its rocker arm 37 in much the same manner as the key bars of all except the 25, 50, 75 cent and one dollar denominations, and at its lower edge is a recess 62$^x$ for engagement with change delivery fingers. To the rear of this key bar is a flexible plate 65$^x$ carrying a coin discharging finger 70 at its upper end. This plate is free to slide in a vertical path independent of the key bar, and at its lower end is pivoted a link 66$^x$ through which the rocker arm 37 extends, so that when said rocker arm is pulled down through the depression of the 5 cent key, it will carry with it the strip 65$^x$ and if a dime has been inserted in the dime chute, it will be forced down by the finger 70 into the dime magazine. This movement, however, is accomplished without in any way affecting the position of the key bar 54$^x$, so that the latter will not move down and engage the change delivery mechanism under it.

At one side of each coin chute is a coin actuated lever, there being four of these levers 73, 74, 75 and 76 that are placed, respectively, along the sides of the dime, quarter dollar, half dollar, and dollar chutes, (Figs. 4 and 12). Each lever is pivoted at its upper end on a pin 78, and is provided with a projecting cam 79 that extends into the coin chute and forms a rest on which the entered coin stops, until, during the downward movement of a key bar, the spring 70 engages with the coin and carries the latter down past the cam 79, this movement forcing the lever outward as will be apparent on reference to Fig. 5. This swinging movement of the lever is transmitted to a number of independent heddle strips 82, 83, 84 and 85, (Fig. 12), which are independently movable and which control the adjustment of the proper change delivery fingers below the key bars. The heddle strips shown in Fig. 12 are those which constitute the principal selecting members for the change delivery fingers, and are all that are necessary for the operation of the machine when single coins are deposited. When two coins are deposited at a single operation, other strips become necessary, as will be hereinafter described.

At the lower front portion of the machine are arranged four fixed parallel bars 87, 88, 89 and 90, (Fig. 3), these bars extending from one end of the casing and forming supports for a large number of pivot pins 91, and on these pins are hung bellcrank levers, each having one end connected to a change delivery finger, and the opposite end to a bar that leads to the discharge slide of the magazine, there being a number of such bars in order to provide for the discharge of the proper amount of change. These bars, (Figs. 13 and 17), taken in the order in which they appear from front to rear of the machine, are five in number, bar 94 controlling the delivery of a nickel, bar 95 controlling the delivery of two dimes, bar 96 controlling the delivery of a dime, bar 97 controlling the delivery of a quarter dollar, and bar 98 controlling the delivery of a half dollar.

For the operation of the five cent delivery bar, nine bell crank levers 99 (Fig. 10) are used, and, for convenience in identification, the reference numerals are followed by the exponent V to designate the value of the change delivered. The lower arms of these bell crank levers are pivoted to the bar 94 and the upper arms thereof are pivotally connected to the change discharge fingers 100, also nine in number, and also bearing the exponent V for identification. These nine fingers are extended upward and terminate in knife edges to be engaged by the recesses at the lower ends of the key bars, and normally they are to one side of the lower ends of said key bars, there being one adjacent to each of the key bars of the 5, 10, 20, 35, 45, 60, 70, 85 and 95 cent denominations. The bar 94 is engaged by one end of a helical tension spring 101, the opposite end of which is connected to the right hand end of the casing and tends to draw the bar toward that end. The extreme right hand end of the bar 94 is turned to the rear, forming an arm 102 that is connected to a coin delivery slide 103 (Fig. 11), said slide being arranged at the bottom of the nickel magazine 104, and having an opening that will receive a single nickel, so that when pulled outward a nickel will fall into the tray 13. Each of the heddle strips is connected by a tension spring 107 to the left hand end of the machine, and in each strip are openings for the passage of the change delivery fingers. The dollar strip 85, i. e. the strip which is actuated by the downward movement of a dollar in the chute, has openings for the passage of every one of the fingers, with the exception of that finger 100 adjacent to the 5 cent key bar, while the half dollar and quarter dollar heddle strips 84 and 83 have openings for the passage of all change delivery fingers below these denominations, with the exception of the 5 cent delivery finger at the extreme right end of the machine. This 5 cent finger is under the control of the shortest, dime heddle strip 82 that is operated by the passage of a dime in contact with the lever 73 (Fig. 12).

At the bottom of the dime reservoir 110 are two slides 111 and 112 (Fig. 4) arranged one above the other, and each having an opening that will permit the entrance of a single dime, and each slide is of the same thickness or of slightly less thickness than a dime. These slides are arranged to be independently operated, so that when ten cents is required for change, the lower slide 111 may be drawn out for the purpose of delivering a single dime, but where twenty cents is required for change, both of the slides 111 and 112 are withdrawn for the purpose of delivering two dimes from the magazine. The lower slide 111 is connected to an arm 113 (Fig. 15) that projects from the right hand end of the bar 96, and said bar is hung from four bell crank levers 114$^x$, the exponent representing the value of the change delivered. From the upper arms of these bell crank levers extend eight change delivery fingers 115$^x$, all of said bell crank levers carrying two fingers each, and said fingers being disposed at one side of the path of movement of the key bars of 10, 15, 35, 40, 60, 65, 85 and 90 cent denominations. The bar 96 is normally held toward the right by a helical tension spring 117. The bar 95, which is held toward the right by a spring 118, is provided with a rearwardly extending arm 119 (Fig. 14) that is connected to both of the ten cent slides 111 and 112. This bar 95 is hung from the pivots 91 by four bell crank levers 120$^{xx}$, the exponents representing the value of change delivered. These bell crank levers carry four change delivery fingers 121$^{xx}$, which are arranged to one side of the path of movement of key bars of the 5, 30, 55 and 80 cent denominations. The bar 97 is normally held to the right by a tension spring 123 (Fig. 16), and is provided at one end with a rearwardly extending arm 124 that is connected to a delivery slide 125 at the bottom of the quarter dollar reservoir 126 (Fig. 4). This bar is hung from the pivots 91 by two bell crank levers 127$^{xxv}$, the exponents representing the value of change delivered by this bar. From the upper arms of these bell crank levers extend change delivery fingers 128$^{xxv}$ which are arranged to one side of the path of movement of the key bars of the 25 and 75 cent denominations. The bar 98 (Fig. 17) which is normally held to the right by a spring 129 is provided with a rearwardly extending arm 130 that is connected to the delivery slide 131 (Fig. 5) at the bottom of the half dollar reservoir 132. This bar 98 is hung from the pivots 91 by two bell crank levers 133$^L$, the exponent representing value of change delivered, and from one of these bell crank levers extends a single change delivery finger 134$^L$ that is disposed in a position to one side of the path of movement of the 50 cent key bar.

In the operation of the machine as thus far described, it will be seen that if a dime is inserted in the chute 20 and the amount of purchase is five cents, the dime will fall into engagement with the shoulder or cam 79 of the lever 73, and then when the 5 cent key bar is pushed down, said bar will engage and depress its rocker arm 37, so that the sleeve 36 will be turned. This movement will be transferred to all of the sleeves 36, 35 and 34, and all of the arms 37 up to and including that of the 50 cent key will be turned. The movement of all of the arms, with the exception of those of the five and ten cent keys, however, is idle, but the arm of the ten cent key, being in engagement with the link 66$^x$ of bar 65$^x$, will pull down on that bar, and the finger 70 which projects into the dime chute will engage the upper edge of the dime resting on shoulder 79 of lever 73, and will pull this dime down beyond the shoulder. This effects swinging movement of the lever 73, which, in moving toward the right, carries the heddle strip 82 in the same direction, and this strip being in engagement with one of the change delivery members 100$^v$ moves the latter under the recess 62 of the 5 cent key bar, and as the latter continues its downward movement, it engages with and depresses said key. This movement is transmitted through the bell crank lever which carries the finger 100$^v$, and from said bell crank lever to the bar 94, the latter being moved toward the left and carrying with it the arm 102, which, being connected to the nickel delivery slide 103, effects the delivery of a nickel into the trough 13. When pressure on the 5 cent key is relieved, the key moves up to its initial position, and all of the parts are again in readiness for another operation.

It will be seen that the selecting movement is transmitted to only one of the change delivery fingers, all of the other fingers remaining to one side of the path of movement of the key bars, so that the depression of any other key bar would have resulted in the delivery of no change whatever. For instance, if the amount of deposit be ten cents, and the amount of purchase ten cents, the depression of the ten cent key would operate to force the dime past the shoulder 73 and the same change delivery finger would be moved under the 5 cent key, but as the ten cent key must be depressed in order to force the money down into the dime magazine, it is impossible to effect, also, the depression of the five cent key and the delivery of change, and as no change delivery fingers were moved under the ten cent key, downward movement of the latter will not effect the delivery of any change.

Should there be a deposit of twenty five cents in payment of a five cent purchase, the depression of the five cent key would be transmitted, as previously described, to the several sleeves, and these, including the sleeve 35 will be turned in order to move down the rocker arm belonging to the twenty-five cent key. This pulls down the quarter dollar beyond the shoulder 79 of the lever 74, and as the latter swings to the right, it carries with it the heddle strip 83. This moves all of the selecting fingers to the right of the 25 cent key, with the exception of the single 5 cent finger 100$^v$ at the extreme right, and as a result, a 20 cent delivery finger 121$^{xx}$ is moved under the 5 cent key bar, and as the latter is moved down, this finger is engaged and depressed, and its movement is transmitted through a bell crank lever 120$^{xx}$ to the bar 95, and from thence through the arm 119 to the delivery slides 111, 112, effecting the discharge of two dimes from the reservoir 110.

Should the purchase have been twenty cents, instead of five cents, the depression of the 20 cent key bar would have caused the latter to engage with one of the 5 cent delivery fingers 100$^v$, and the movement would have been transmitted in the manner previously described for the purpose of delivering a single nickel from the reservoir. Should the purchase have been ten cents, the bar 65 adjacent to the 10 cent key would have moved down and would have engaged a 5 cent finger 100$^v$ and the 10 cent finger 115$^x$, and movement would have been transmitted as described to both slides 103 and 111, effecting the delivery of a nickel and a dime.

Should there be a deposit of one dollar in payment of a purchase of a value less than one dollar, the pressing down of the proper purchase key will act, as before described, to effect downward movement of the spring finger 70 of the dollar chute, owing to the fact that the pin 30′ at the end of the shaft 30 will engage with and rock the sleeve 31 which carries the dollar rocker arm 37. The downward movement of the dollar will rock the lever 76, and the long heddle strip 85 will be moved for the purpose of adjusting all of the change delivery fingers with the exception of the single 5 cent delivery finger 100$^v$ at the extreme right of the machine. Continued downward movement of the purchase key will then bring the end of the key bar into engagement with one or more of the change delivery fingers, and the proper change delivery slides will be actuated. For instance, if the deposit is one dollar, and the purchase five cents, the depression of the 5 cent key will move down all of the rocker arms up to and including that belonging to the 50 cent key. The downward movement of the bars 65 of the 50 and 25 cent keys will effect the delivery of half dollar and quarter dollar, while the 5 cent key bar will engage and depress the 20 cent slide, effecting the delivery of two dimes, making in all ninety-five cents change.

Should the amount of purchase be sixty cents, the depression of the 60 cent key bar causes, also, the downward movement of the bar 65 of the 75 cent key, and the latter moves into engagement with one of the quarter dollar delivery fingers, effecting the delivery of a quarter dollar, while the lower end of the key bar 60 engages dime and nickel fingers, so that forty cents, the proper change, will fall into the trough 13. The depression of any of the key bars will result in the delivery of the proper amount of change owing to the fact that the downward movement of the dollar has effected, through the heddle strip 85, an adjustment of all of the change delivery fingers, so that there is one or more under each of the key bars.

When a paper dollar is tendered, a special key bar 140 (Figs. 1, 2 and 28) is depressed. This key bar is placed at the extreme left of the machine and normally is held in elevated position by a suitable spring 141. The lower end of the key bar is connected by a bell crank lever 142 to the long heddle strip 85, Figs. 12 and 28 so that when this key is moved down, the heddle strip will be adjusted in the same manner as though a silver dollar had been inserted in the machine. In order to retain the bar in depressed position until the completion of the down stroke of the purchase key, said bar is provided with a small shoulder 143, for the reception of a small spring catch 144, which is engaged and released on the downward movement of bar 55 of the dollar key, said bar having a small cam 145 which forces the catch to release position and allows the key bar to move to its normal elevated position. In order to keep a record of the number of paper dollars received, the dollar key bar 140 is provided with a projecting finger 147, which engages a counting or registering mechanism 150, of ordinary construction, this mechanism being preferably placed at the left hand end of the machine, and being operated each time the paper dollar key bar is actuated.

In order to keep an accurate record of the amounts of purchase, a mechanism similar to that employed in recording or totaling cash registers may be used, but it is preferred to employ a simple form of sales indicating mechanism.

At a point slightly above the shaft 30 is a shaft 153, (Figs. 3 and 4) that extends from end to end of the machine and carries twenty independently movably collars 154, from each of which projects a rocker arm 155 that is connected by a link 156 to one of the key bars. Extending from the rear faces of the collars 154 are arms 158 which are arranged to engage the lower ends of indicating strips 159, of which there is one for each key bar, and said strips bear numerals corresponding to those of the key bars with which they are connected.

The upper portions of the indicating strips are guided in suitable openings formed in an upper plate or frame 160, while the lower ends thereof are guided by a pair of pins 161 that extend into recesses 162 formed in one side of each strip, the pins serving further as a means for limiting the movement of the strip in both directions. For the purpose of keeping the strip in place, a small spring 164 is arranged in each of the upper guiding recesses and bears against one side of the strip.

On that side of each of the strips opposite recess 162 is a pair of notches 166—167, the upper notch 166 normally receiving a pin 168 that is carried by a longitudinally movable bar 169 (Fig. 29) held in suitable guides 170. This bar is movable in the direction of its length, and is normally held with its pins 168 in engagement with notches 166 by means of a small tension spring 171. When the strips 159 are moved up by the bars 158, the pins 168 enter the lower notches 167 and maintain the strips in elevated or display position.

On the lower end of each strip 159 is a recess one wall of which forms a cam 173, and said cam is directly in the path of movement of an arm 158, and is engaged by the latter as it moves upward. It will be seen that when an arm 158 engages one of the cams 173, the strip 159 will be forced sidewise until the arm 158 reaches the upper end of the cam, and thereafter the strip will be carried upward to display position, but the movement will be on a slightly inclined line, as shown, for instance, by dotted lines in Fig. 29. The effect of this is to act on the bar 169 through the pin 168 that is in engagement with the strip being moved, and as said bar 169 moves against the stress of the spring 171 all of the pins 168 will be moved from engagement with the notches of the display strips, and that strip which has been previously elevated to display position will be released and allowed to fall by gravity to its normal position, while the strip indicating the amount of the last purchase will be elevated. In this manner it is impossible for more than one display strip to occupy display position at any one time, and each strip that is elevated must remain in the elevated position until another purchase key is depressed.

In order to accomplish the withdrawal of silver dollars from the dollar magazine for the purpose of making change for bills of other denomination, a delivery slide 180 is arranged in the lower portion of the dollar magazine 181 (Figs. 21 and 22). This slide is engaged by a spring retracted arm 182 that is hung at one end of a small link 183 and is connected to one arm of a bell crank lever 184 that is pivoted to the frame of the machine. The opposite arm of the bell crank lever is connected to a bar 185 that extends out through a small slot 186 at the front of the casing, and is provided with a finger piece 26 which may be engaged and depressed for the purpose of actuating the slide 180, and effecting the discharge of dollars from the magazine 181 into the drawer 25. The bar 185 is connected by a link 190 and lever 191 to a pawl 192 that engages the teeth of a primary indicating disk 193, and the latter is provided with suitable transfer mechanism for actuating higher disks 195. Three disks are shown in the present instance, and these may be of a construction commonly employed in totaling mechanisms.

The mechanism thus far described will insure the delivery of the proper amount of change where a single coin is deposited, but in many cases two coins are tendered, for instance, two half dollars in payment of a sixty cent purchase, or two quarter dollars in payment of a thirty cent purchase, or two dimes in payment of a fifteen cent purchase. In order to provide for this, the additional coin chutes 17, 19 and 21 are used, and mechanism is added for the purpose of controlling the adjustment of the change delivery fingers in accordance with the amount of deposit. By the mechanism previously described, it was possible to control the adjustment of those change delivery fingers adjacent to key bars of less denomination than the coin deposited, but where two coins are deposited, it becomes necessary to so arrange the heddle strips as to control the adjustment of change delivery fingers of key bars up to within five cents of the total value of the deposit. For this purpose three additional heddle strips 200, 201 and 202 are employed, the strip 200 being arranged to control the adjustment of the delivery fingers under the key bars from the 55 cent to the 95 cent denomination. The strip 201 controls the adjustment of the change delivery fingers under key bars from 30 to 45 cent denominations, while the strip 202 is arranged to control the change delivery finger under the 15 cent key bar. The mechanism for operating these additional strips is the same in each case, and a description of one of them will be sufficient for the present purpose.

Referring now to Figs. 3, 5, 6 and 7, which illustrate the mechanism of the 50 cent chute and key bar, it will be seen that in the lower portion of the chute 16 a weighted switch 203 is arranged in the path of a descending coin. This switch will normally assume the position shown in Fig. 3 by gravity, and the weight 204 is so arranged that when a coin entered in the chute 16 engages the switch, said weight will be forced across the chute 17, and will serve as a stop for the second half dollar deposited in said chute, it being understood that where two half dollars are tendered the first is inserted in chute 16, and stops in engagement with the cam 79 of slide adjusting lever 75 and at the same time throws the switch so that when a second coin is inserted it will be deflected by the switch into the chute 17 and will fall until it is engaged by the stop weight 204. The lower end of the bar 75 extends down through an L-shaped slot 207 in the heddle strip 84 and normally is in engagement with the narrow portion 208 of such slot, as will be seen on reference to Fig. 8, so that under ordinary conditions where only one-half dollar is inserted, the movement of bar 75 will be transmitted to the heddle strip 84 that controls the adjustment of change delivery fingers or key bars of denominations less than fifty cents. Where, however, two half dollars are inserted, it becomes unnecessary to adjust the heddle strip 84, but the heddle strip 200 must be moved, and the bar 75 is, therefore, moved forward slightly, so that it will be in the larger or wider portion of the slot 207, and when moved by the passage of the coin it will not operate the strip 84 but will swing idly in the wider portion of the slot. The slide 200 is, also, provided with an L shaped slot 210 which is arranged reversely with respect to the slot 207, and the lower end of the lever 75 normally occupies a position within the wider portion of the slot 210, but when the lever is to operate the slide 200, it is moved to the front, so as to enter the wider portion of the slot 207, and the narrower portion of slot 210. Projecting from the rear of the chute 17 is a small bracket 212 (Fig. 3) on which is pivoted a lever 213, the upper end of the lever carrying an arm 214 which may pass through a suitable opening formed in the rear wall of chute 17 and bears against the half dollar that is held by the weight of the stop 204. The lower end of the lever has a loose pin and slot connection with a secondary lever 216, the lower end of which is provided with a horizontally disposed arm 217, and in the arm is a slot 218 (Fig. 6) through which the lever 75 extends. Depending from the frame plate 53 is a bracket 219 to the lower end of which is pivoted a bell crank lever 220, the horizontal arm of which projects into the path of movement of the lug 66, that is at the bottom of the 50 cent key bar, and as the latter is moved down, the bell crank lever will be oscillated. The upper arm of the bell crank lever is connected by a link 221 to the secondary lever 216, and each time the 50 cent key bar is depressed, movement will be imparted to the secondary lever 216. Should there be no coin entered in the second chute 17, the lever 216 will swing backward slightly with the bar 75 as a fulcrum, and the connected ends of the levers 213 and 216 will move to the rear, while the arm 214 will enter the chute 17. Should there be a coin in the chute 17, the arm 214 will engage against the coin, and said lever 213 will, therefore, be held rigid, and its lower end will form a fulcrum for the movement of the secondary lever 216, so that the lower end of said lever 216 will be swung to the rear and the lever 75 will be moved in the widest portion of the slot 207 and into the narrowest portion of the slot 210. As a result of this, the heddle strip 84 will be idle, while the heddle strip 200 will operate to adjust all of the change delivery fingers of the key bars from 55 to 95 cent denominations, and the depression of any one of these representing the amount purchased will result in engagement of the bar with the proper change delivery finger or fingers, and the withdrawal of the proper change from the magazines in the manner previously described. During this operation the arm 25 will be swung in one direction and when released the elasticity of the arm will restore it to normal position.

The additional heddle or selecting slide 200 is provided with openings for the reception of all of the change delivery fingers from 55 cents upward, and the heddle 201 is provided with openings for the passage of the change delivery fingers under the keys of the 30, 35, 40 and 45 cent denominations. The heddle 202 is provided with a single opening 230 which controls the adjustment of an additional change delivery finger 100ª that is connected by a suitable bell crank lever to an arm 233 that extends from the delivery slide operating arm 102, (Fig. 13), and controls the delivery of a nickel. This additional finger is rendered necessary owing to the fact that the only change delivery finger under the 15 cent key is one which controls the delivery of a dime, and where two dimes are inserted or deposited in payment of a fifteen cent purchase, only five cents is required for change. To permit proper operation of this mechanism, it is necessary to provide for the temporary clutching of certain of the locking sleeves carried by the shaft 30, it being remembered that for ordinary work where single coins are inserted, the sleeves operate more or less independently of each other. The sleeve 34, for instance, may rotate independently of the sleeve 35, but if two quarter dollars are inserted in payment for a thirty cent purchase, it becomes necessary to provide for the transmission of movement from the sleeve 34 to the sleeve 35, so that the latter sleeve may operate for the purpose of pulling down the coins inserted in the chutes. To accomplish this connection between the sleeves, a clutch of the character shown in Figs. 26 and 27 is employed. This clutch comprises a yoke 237 having a projecting lug 238 arranged to enter and fill the space between the clutching teeth 43. The yoke is carried by a rod 239 that extends up from the top of the casing and is provided with a push knob 240. Normally this rod is held in elevated position by a small compression spring 241, and when forced downward a shoulder 243 on the rod is engaged by a portion of the frame, and the rod is locked in the depressed position with the lug entered in the space between the clutching teeth, as shown in dotted lines in Fig. 26. The lower end of the rod 239 is provided with a transversely extending pin that enters an arcuate slot or slots 245 formed in the yoke, and said yoke is normally maintained in the position shown in Fig. 26 by a small tension spring 246. When the rod is depressed and locked in depressed position, the turning of the sleeve 34 by the depression of any one of the key bars connected thereto will revolve the clutch and will, also, revolve the sleeve 35, the clutch moving to the position shown in Fig. 27 during this operation. As the down stroke is completed, an arm 248 will engage the rod 239 and force the latter slightly to one side, thus releasing its shoulder 243 and permitting the spring 241 to elevate the rod and withdraw the clutch, so that the sleeves will again be free to move independently of each other. Similar clutches are employed between the sleeves 34 and 33, and between the sleeves 35 and 36, as indicated at 250 and 251 in Fig. 4.

In order to lock the sleeve 32 to its shaft, which in some cases is necessary, the clutch 253 is employed, said clutch being practically of the construction previously described with the exception that its clutching lug 238′ is arranged to enter recesses 254 (Fig. 23) formed in the sleeve and in the shaft 30. The construction of this clutch is best shown in Figs. 24 and 25.

While the capacity of the present machine is but one dollar, it is obvious that the key system may be extended to provide for larger sums either in gold or notes and one method of operation where a bill or coin of larger denomination than one dollar is received is provided for.

At a point adjacent to the paper dollar key is arranged a key 260, the lower end of which has a pawl 261 engaging with the registering mechanism 150, and from one side of the key projects an arm 262 which will operate the rod or lever 263 through which movement is imparted to the registering mechanism. When, therefore, a larger amount than one dollar is received, for instance, a five dollar note in payment of a purchase amounting to one dollar and fifty cents, the cashier will open the money drawer, place the five dollars therein and remove four dollars in change. Three of these dollars are returned to the customer and the key 260 is depressed in order to register a sale of one dollar, and at the same time to actuate the indicator 150 to show that a dollar has been received. The fourth dollar is then placed in the dollar slot or chute and the fifty cent key is depressed, operating the machine in the usual manner and making a record of fifty cents and returning fifty cents to the customer.

I claim:—

1. In a change making machine, purchase keys, change delivery members normally arranged in inoperative position with relation to said purchase keys, and means under the control of deposited coins, and receiving motion through the coins for adjusting said members to operative position.

2. In a change making machine, purchase keys, change delivery members normally arranged in inoperative position with relation to said purchase keys, means operable by the purchase keys for engaging and forcing the deposited coins into the machine, and means arranged in the path of such coins and connected to said change delivery members for adjusting the latter to operative position.

3. In a change making machine, purchase keys, change delivery members normally arranged beyond the paths of movement of said purchase keys, and means under the control of deposited coins for adjusting said members into the path of movement of the keys.

4. In a change making machine, a single bank of purchase keys, change delivery members normally disposed to one side of the path of movement of the keys, and means under the control of deposited coins for adjusting said members into the path of movement of the purchase keys of less denomination than the value of the coin deposited.

5. In a change making machine, purchase keys, change delivery members operable by said keys, and means under the control of deposited coins and receiving motion through the coins for permitting operation of those members which control the delivery of change to an amount less than the value of the deposited coin.

6. In a change making machine, separate magazines for coin of different value, chutes leading to said magazines for conveying deposited coins thereinto, change delivery members for withdrawing coins from the magazines, purchase keys for operating said delivery member, and means under the control of and receiving motion through the deposited coins for adjusting the positions of said members.

7. In a change making machine, a plurality of magazines for the reception of coins of different value, coin chutes for conveying deposited coins into said magazine, change delivery members for discharging coins from said magazine, and means under the control of and receiving motion through deposited coins for permitting the operation only of those members which control the discharge of change to an amount less than the value of the deposited coin.

8. In a change making machine, a plurality of magazines for the reception of coins of different value, chutes leading to said magazines for conveying deposited coins thereinto, change delivery members operating to discharge coins from said magazines, mechanism under the control of and receiving motion through the deposited coins for adjusting the position of said member, and purchase keys for actuating said members.

9. In a change making machine, magazines for the reception of coins of different value, chutes for conveying deposited coins into said magazines, change delivery members for delivering the coins from the magazines, and coin engaged means arranged within the chutes and receiving motion through said coins for preventing the delivery of change to an amount in excess of the value of the deposited coins.

10. In a change making machine, a plurality of magazines for the reception of coins of different values, coin chutes for directing deposited coins into said magazines, coin engaged members projecting within said chutes and receiving motion through the coins, change delivery members controlling the discharge of coins from the magazine, means for connecting the coin engaged members to the change delivery members, and purchase keys for actuating the change delivery members.

11. In a change making machine, a bank of purchase keys, change delivery members, heddle strips for moving said members into or out of the path of movement of the keys, and mechanism actuated by deposited coins for transmitting movement to said heddle strips.

12. In a change making machine, a bank of purchase keys, change delivery members, heddle strips connected to said members, and of a number equal to the number of different denominations of coins which the machine is adapted to receive, and means under the control of deposited coins for transmitting movement to said heddle strips.

13. In a change making machine, a bank of purchase keys, change delivery members normally arranged in inoperative position with relation to said keys, heddle strips connected to said members, coin chutes, and heddle strip actuating devices projecting into said coin chutes in the position to be engaged by deposited coins.

14. In a change making machine, chutes arranged for the deposit of coins of different value, a bank of purchase keys, change delivery members normally arranged in inoperative position with relation to said keys, heddle strips connected to said members, and of a number equal to the number of chutes, coin engaged means arranged within the chutes and receiving motion through the coins for transmitting movement to said heddles, each heddle controlling the adjustment of change delivery members of purchase keys of a denomination less than the value of the coin which actuates them.

15. In a change making machine, chutes arranged for the deposit of coins of different value, a bank of purchase keys, change delivery members normally arranged in inoperative position with relation to said purchase keys, a plurality of heddle strips having openings for the passage of said members, and coin actuated levers connected to the heddles and projecting into the chutes in the path of deposited coins, each heddle strip controlling the adjustment of change delivery members into operable relation with purchase keys of a denomination less than the amount of deposit.

16. In a change making machine, a plurality of change delivery members, a bank of purchase keys, a heddle strip connected to said members, and means receiving motion through inserted coins for moving said strip to adjust said members into operable relation with the keys.

17. In a change making machine, change delivery members, a bank of purchase keys, and means receiving motion through inserted coins for adjusting said members into operable relation with said purchase keys to permit the delivery of change.

18. In a change making machine, coin magazines, change delivery slides, actuating bars connected thereto, pivotally mounted fingers operatively connected to said bars, purchase keys for actuating said fingers, and means receiving motion through inserted coins for moving said fingers into and from operable relation with said keys.

19. In a change making machine, coin magazines, change delivery slides at the lower portions of the magazines, bars for actuating said slides, bell crank levers on which said bars are hung, fingers connected to said bell crank levers, purchase keys for actuating said fingers, and means for adjusting the positions of said fingers with respect to the keys.

20. In a change making machine, coin magazines, change delivery slides for discharging coins from the lower portion of said magazines, slide actuating bars, bell crank levers on which said bars are hung, fingers carried by the bell crank levers, purchase keys for actuating said fingers, and means actuated by deposited coins for adjusting the positions of said fingers.

21. In a change making machine, the combination with coin magazines, of delivery slides arranged at the lower portion of the magazines, bars for actuating said slides, bell crank levers on which said bars are hung, fingers carried by said bell crank levers, purchase keys for actuating the fingers, heddle strips for adjusting the positions of said fingers, and means actuated by deposited coins for moving said heddles.

22. In a change making machine, a plurality of coin magazines, means for discharging coins therefrom, a plurality of bars connected to said coin discharging means, bell crank levers on which the bars are hung, fingers pivotally connected to the levers, heddle strips having openings for the passage of the upper portions of said fingers, purchase keys for actuating the fingers, coin chutes leading to the magazines, and heddle actuating cam levers projecting within said coin chutes.

23. In a change making machine, a plurality of magazines for the reception of coins of different value, chutes for directing deposited coins into said magazines, pivoted levers arranged at the sides of the chutes, and each having a cam extending into one of said chutes, a bank of purchase keys, change delivery members arranged to be engaged by said keys, heddle strips connected to said members, coin engaged means arranged within the chutes and receiving motion through the coins for transmitting movement to said heddles and means for connecting the cam levers to said heddle strips.

24. In a change making machine, a plurality of chutes for the deposit of coin of different value, a bank of purchase keys, coin delivery members normally in inoperative position with respect to the purchase keys, heddle strips for adjusting said members, coin engaged cam levers connected to the heddle strips, and projecting partly within the chutes to stop the gravitational descent of the coins, and means operable on the depression of any key for forcing down in the chutes coins of a value higher than that represented by said key.

25. In a change making machine, a plurality of chutes for the deposit of coins of different value, means at each chute for arresting the gravitational descent of a deposited coin, means in each chute for forcing the deposited coin downward, a bank of purchase keys, and means operable on the depression of any key for actuating the forcing means which engage with coins of a value higher than that represented by the depressed key.

26. In a change making machine, a plurality of coin chutes for the deposit of coins of different value, change discharge members, coin engaged members arranged within each chute and connected to said change discharge members, means at each chute for positively forcing an entered coin downward through the chute, a bank of purchase keys, and mechanism whereby downward movement of any purchase key may be transmitted to all of the coin forcing members.

27. In a change making machine, a rock shaft, a plurality of rock sleeves mounted thereon, one of which is secured to the shaft, rocker arms extending from said sleeve and divided by the sleeves into groups, purchase keys for actuating said rocker arms, chutes in which coins may be deposited, means for arresting the gravitational descent of the coins on the chutes, fingers for forcing the coins downward through the chutes, slide bars carrying said fingers and arranged adjacent to the purchase keys, means for connecting said slide bars to the rocker arms, there being one slide bar connected to each rock sleeve, coin delivery members, and means actuated by coins passing through the chutes for adjusting said members into operative relation to the keys.

28. In a change making machine, a rock shaft, a plurality of sleeves mounted thereon, one of said sleeves being secured to the shaft, clutch teeth for connecting adjacent sleeves and arranged to permit independent movement of sleeves representing higher value, rocker arms extending from said sleeves and divided by the latter into groups, purchase key bars for operating the rocker arm, coin chutes adjacent to the key bars and adapted for the passage of coins of different value, a cam lever projecting into each chute and forming a stop for each deposited coin, fingers for forcing the coins downward past said levers, slide bars carrying said levers and arranged adjacent to the keys, a plurality of change delivery members normally in inoperative position with respect to the key bars, and slide bars, heddle strips to which all of said members are connected, and means for connecting the heddle strips to the coin engaged levers.

29. In a change making machine, a rock shaft, a plurality of rock sleeves mounted thereon, one of said sleeves being rigid with the shaft, rocker arms projecting from the sleeves and divided by the latter into groups, purchase key bars for actuating said rocker arm, chutes for the deposit of coins of different values, levers having cam shaped portions projecting into said chutes to arrest the gravitational descent of the coins, change delivery members normally in inoperative position with respect to the key bars, heddle strips to which all of said members are connected, means for connecting said heddle strips to the cam levers, means operable from one rocker arm of each group for forcing downward the arrested coins, and independent clutching devices for temporarily connecting the rock sleeves to each other.

30. In a change making machine, a double coin chute for the reception of coins of the same value, means operable by the first coin inserted for deflecting the following coin into the second chute, change delivery fingers, a plurality of heddle strips to which said fingers are connected, a coin actuated lever, mechanism under the control of the second coin for operatively connecting said lever to one or other of the heddle strips, and purchase key bars for actuating said fingers.

31. In a change making machine, the combination with purchase key bars, of change delivery fingers, a plurality of heddle strips connected independently to each of the fingers, both above and below the value of the coin deposited, a coin chute, a coin actuated lever arranged therein and having a connection with both heddle strips, a second chute, means under the control of the first coin deposited for deflecting a second coin into the second chute, a pivotally mounted lever arranged to engage such second coin, and an adjusting lever hung therefrom and arranged to engage the heddle actuating lever to control the heddle strip to be actuated in accordance with the number of coins deposited.

32. In a change making machine, a coin chute, a spring coin engaging finger normally held out of the chute, a slide bar carrying said finger, and a finger key arranged to engage said slide bar and depress the same to effect downward movement of the finger and the forcing of the coin through the chute.

33. In a machine of the class described, the combination with a bank of purchase keys, of change delivery members, a heddle strip connected to said members, and arranged to receive motion through the insertion of a silver dollar and a paper dollar key connected to said heddle strip and serving when depressed to transmit movement thereto to adjust said change delivery members into operative relation with the purchase keys.

In testimony that I claim the foregoing as my own, I have hereto affixed my signature in the presence of two witnesses.

ANDREW PETERSON.

Witnesses:
A. M. PARKINS,
JNO. E. PARKER.